United States Patent
Shannon et al.

(10) Patent No.: US 10,857,972 B2
(45) Date of Patent: Dec. 8, 2020

(54) CHILD RIDER FEATURES FOR AN AUTONOMOUS VEHICLE

(71) Applicant: GM Cruise Holdings LLC, San Francisco, CA (US)

(72) Inventors: Jacqueline Mary Shannon, San Francisco, CA (US); Stephanie Olivia Engle, San Francisco, CA (US); Mallory McMillan, San Francisco, CA (US); Jessica Davies, San Ramon, CA (US); Jessica Uelmen, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 16/836,865

(22) Filed: Mar. 31, 2020

(65) Prior Publication Data

US 2020/0254967 A1    Aug. 13, 2020

Related U.S. Application Data

(63) Continuation of application No. 16/273,109, filed on Feb. 11, 2019, now Pat. No. 10,640,082.

(51) Int. Cl.
*B60R 22/48* (2006.01)
*G06Q 10/02* (2012.01)
(Continued)

(52) U.S. Cl.
CPC .......... *B60R 22/48* (2013.01); *G05D 1/0088* (2013.01); *G06Q 10/02* (2013.01); *G06Q 50/30* (2013.01);
(Continued)

(58) Field of Classification Search
CPC ............ B60R 22/48; B60R 2022/4866; G05D 1/0088; G05D 2201/0213; G06Q 10/02; G06Q 50/30
See application file for complete search history.

(56) References Cited

U.S. PATENT DOCUMENTS

| 7,809,797 B2 | 10/2010 | Cooley et al. |
| 7,909,246 B2 | 3/2011 | Hogg et al. |

(Continued)

FOREIGN PATENT DOCUMENTS

CN    103650466 A    3/2014

OTHER PUBLICATIONS

"Non-Final Office Action for U.S. Appl. No. 16/273,109", dated Oct. 15, 2019, 15 Pages.
(Continued)

*Primary Examiner* — Emily C Terrell
(74) *Attorney, Agent, or Firm* — Medley, Behrens & Lewis, LLC

(57) ABSTRACT

An autonomous vehicle including a vehicle propulsion system, a braking system, a steering system, and a computing system that is in communication with the vehicle propulsion system, the brake system, and the steering system. The computing system can receive an indication an account associated with a passenger of the autonomous vehicle for a trip of the autonomous vehicle includes a predefined parent-child link with a second account. The predefined parent-child link indicates the account associated with the passenger is subordinate to the second account and a parent-child relationship exists between the passenger and a person associated with the second account. Responsive to receiving the indication of the parent-child link and the passenger being the child in the parent-child relationship, the comput-
(Continued)

ing system can control the autonomous vehicle to enable a linked account feature that would otherwise be disabled.

20 Claims, 9 Drawing Sheets

(51) Int. Cl.
  *G05D 1/00* (2006.01)
  *G06Q 50/30* (2012.01)
(52) U.S. Cl.
  CPC ............... *B60R 2022/4866* (2013.01); *G05D 2201/0213* (2013.01)

(56) References Cited

U.S. PATENT DOCUMENTS

| | | | |
|---|---|---|---|
| 8,676,619 | B2 | 3/2014 | Lotvin et al. |
| 9,971,348 | B1 | 5/2018 | Canavor et al. |
| 2010/0256852 | A1 | 10/2010 | Mudalige |
| 2010/0302022 | A1* | 12/2010 | Saban .................... B60N 2/002 340/459 |
| 2012/0083960 | A1 | 4/2012 | Zhu et al. |
| 2016/0059865 | A1* | 3/2016 | Ricci ...................... G06Q 10/02 701/36 |
| 2016/0173568 | A1 | 6/2016 | Penilla et al. |
| 2017/0361792 | A1* | 12/2017 | Lem ........................ E05B 77/26 |
| 2018/0137593 | A1 | 5/2018 | Djuric et al. |
| 2019/0258263 | A1 | 8/2019 | Wendel et al. |

OTHER PUBLICATIONS

"Response to the Non-Final Office Action for U.S. Appl. No. 16/273,109", filed Dec. 31, 2019, 15 Pages.

"Notice of Allowance and Fees Due for U.S. Appl. No. 16/273,109", dated Feb. 18, 2020, 8 Pages.

* cited by examiner

CHILD RIDER FEATURES FOR AN AUTONOMOUS VEHICLE

CROSS-REFERENCE TO RELATED APPLICATION

This application is a continuation of U.S. patent application Ser. No. 16/273,109, filed on Feb. 11, 2019, and entitled "CHILD RIDER FEATURES FOR AN AUTONOMOUS VEHICLE", the entirety of which is incorporated herein by reference.

BACKGROUND

An autonomous vehicle is a motorized vehicle that can operate without a human driver. According to an exemplary scenario, a passenger may request a ride in an autonomous vehicle from a given location to a destination location. When the passenger requests the ride in the autonomous vehicle, he or she may be provided with information concerning the upcoming ride prior to pickup (e.g., pickup time, pickup location, information to identify the autonomous vehicle). Moreover, the autonomous vehicle may pick up the passenger at the given location and follow a route to the destination location, where the passenger can be dropped off.

In conventional approaches, substantially similar types of information may be provided responsive to requesting a ride in an autonomous vehicle regardless whether a passenger is an adult or a child. Moreover, the autonomous vehicle may use substantially similar operating procedures regardless whether the passenger is an adult or a child.

SUMMARY

The following is a brief summary of subject matter that is described in greater detail herein. This summary is not intended to be limiting as to scope of the claims.

Described herein are various technologies pertaining to controlling operation of an autonomous vehicle based on a passenger of the autonomous vehicle being a child. For instance, a particular passenger can be identified as being a child passenger based on having a parent-child link in their account. With more specificity, the autonomous vehicle can receive an indication of the parent-child link in an account of a child passenger and can enable a linked account feature of the autonomous vehicle based on the presence of the parent-child link. But for the presence of the parent-child link the linked account feature would be disabled. The linked account feature enabled can depend on an identity(s) of the passenger(s). For instance, a first linked account feature can be enabled when the child is traveling alone and a second linked account feature can be enabled when the parent is traveling with their child.

In one example, an autonomous vehicle includes a vehicle propulsion system, a braking system, a steering system, and a computing system that is in communication with the vehicle propulsion system, the braking system, and the steering system. The computing system can receive an indication that an account of a passenger of the autonomous vehicle for a trip of the autonomous vehicle includes a predefined parent-child link with a second account. The predefined parent-child link can indicate a parent-child relationship between the passenger and a person associated with the second account. In one embodiment, the passenger is the child in the parent-child relationship. Responsive to receiving the indication of the parent-child link, the computing system can enable a linked account feature of the autonomous vehicle.

In an embodiment, the linked account feature includes controlling operation of the autonomous vehicle to perform certain actions that would not be performed otherwise. For instance, doors of the autonomous vehicle can be individually unlocked based on a position of the child passenger compared to a position of the parent passenger. In another embodiment, the linked account feature includes displaying notifications on a mobile device operated by the parent of the parent-child link that would not otherwise be displayed.

The above-described technologies present various advantages over conventional approaches to autonomous vehicle operation. First, unlike the conventional approach of applying a similar operation for a variety of passengers regardless whether the passengers are adults or children, the above-described technologies enable selective operation of an autonomous vehicle based on a passenger's account being subordinate to another person's account. Secondly, the above-described system allows a parent to control operation of an autonomous vehicle their child is riding in by making changes to the child's account.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
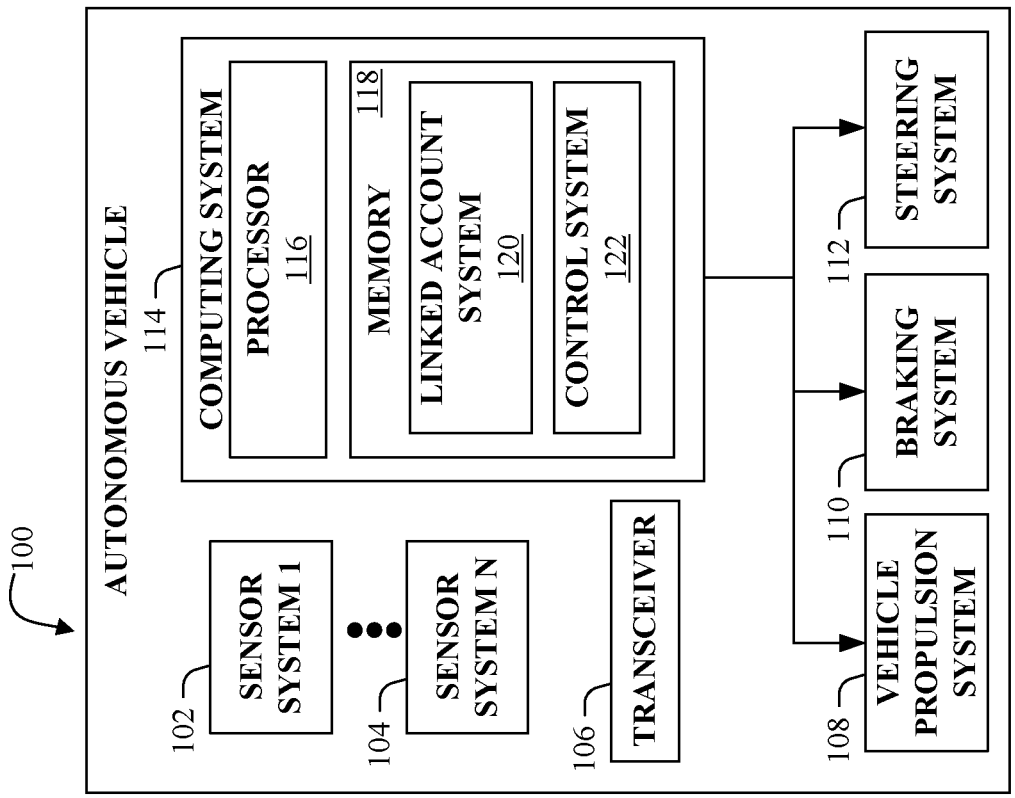
FIG. 1 illustrates an exemplary autonomous vehicle.

Various technologies pertaining to selecting are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Moreover, as used herein "parent" is intended to encompass any party that has been entrusted to care for a child. The party can include, but is not limited to, a biological or adoptive mother, a biological or adoptive father, a grandmother and/or grandfather, a state-mandated guardian, and/or the like. Further, as used herein "child" is intended to encompass a minor or someone legally incapable of managing his or her own affairs.

Disclosed are various technologies that permit a parent to modify operation of an autonomous vehicle their child is riding in. An account associated with the child can include a parent-child link making the child's account subordinate to an account associated with the parent. This parent-child link can allow the parent to make certain modifications to the child's account that the child may not be able to alter. For instance, the parent can specify that the child has to indicate that they feel secure in the autonomous vehicle before the autonomous vehicle can begin the trip. The existence of the parent-child link in the child's account causes the autonomous vehicle to enable certain linked account features which will be described in detail below. Absent the parent-child link the linked account features are disabled. If the parent rides without the child and/or an account associated with the passenger doesn't include a parent-child link, the autonomous vehicle will not enable the linked account feature. Thus, a parent can modify operation of the autonomous vehicle by establishing the parent-child link.

With reference now to FIG. 1, illustrated is an exemplary autonomous vehicle 100. The autonomous vehicle 100 can navigate about roadways without human conduction based upon sensor signals output by sensor systems of the autonomous vehicle 100. The autonomous vehicle 100 includes a plurality of sensor systems, namely, a sensor system 1 102, . . . , and a sensor system N 104 (collectively referred to herein as sensor systems 102 and 104). The sensor systems 102 and 104 are of different types and may be arranged about the autonomous vehicle 100. For example, the sensor system 1 102 may be a lidar sensor system and the sensor system N 104 may be a camera (image) system. Other exemplary sensor systems 102 and 104 included are radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 108, a braking system 110, and a steering system 112. The vehicle propulsion system 108 may be an electric motor, an internal combustion engine, or the like. The braking system 110 can include an engine brake, brake pads, actuators, and/or any other suitable componentry that is configured to assist in decelerating the autonomous vehicle 100. The steering system 112 includes suitable componentry that is configured to control the direction of the movement of the autonomous vehicle 100.

The autonomous vehicle 100 additionally comprises a computing system 114 that is in communication with the sensor systems 102 and 104, the vehicle propulsion system 108, the braking system 110, and/or the steering system 112. The computing system 114 includes a processor 116 and memory 118 that includes computer-executable instructions that are executed by the processor 116. In an example, the processor 116 can be or include a graphics processing unit (GPU), a plurality of GPUs, a central processing unit (CPU), a plurality of CPUs, an application-specific integrated circuit (ASIC), a microcontroller, or the like.

The memory 118 includes a control system 122 configured to control operation of the vehicle propulsion system 108, the braking system 110, and/or the steering system 112. The memory 118 further includes a linked account system 120 that causes the autonomous vehicle 100 to enable a linked account feature in response to receiving an indication an account of a passenger includes a parent-child link, as will be described in detail below.

In order to receive the indication, the autonomous vehicle 100 may further include a transceiver 106. The transceiver 106 is configured to transmit data from the autonomous vehicle 100 and/or receive data at the autonomous vehicle 100. Thus, the autonomous vehicle 100 can be in communication with one or more computing systems.

The linked account system 120 is configured to enable one or more linked account feature in response to the linked account system 120 receiving an indication a link exists between at least two accounts. More specifically, an indication that an account corresponding to a passenger of the autonomous vehicle 100 includes a predefined parent-child link to a second account. The parent-child link can indicate a parent-child relationship between the passenger and a party associated with the second account. For instance, the passenger is the child and the party associated with the second account is his or her parent. In another example, the passenger is the parent and the party associated with the second account is his or her child.

In one embodiment, the linked account system 120 is configured to determine whether the parent-child link exists in the account associated with the passenger. The linked account system 120 can be configured to access a data store which stores the account associated with the passenger to determine whether the parent-child exists in the account. In another embodiment, a separate computing system includes a data store which stores the account associated with the passenger and the computing system transmits data to the autonomous vehicle indicative of the account associated with the passenger having the parent-child link.

The parent-child link can further indicate that one of the accounts is at least partially subordinate to the other account. For instance, the parent account 408 (FIG. 4) can control certain settings for and/or information in the child account 410 (FIG. 4), as will be described in detail below. The parent-child link may further prevent the child from adjusting the settings and/or information supplied by the parent.

Responsive to receiving indication of the parent-child link, the linked account system 120 enables one or more linked account features. The amount and kind of linked account feature can depend on who in the parent-child relationship is a passenger in the autonomous vehicle 100. Additionally, the parent in the parent-child link can pre-define in the child account which linked account features to enable. For instance, a first linked account feature is enabled when the child is the passenger. In another example, a second linked account feature is enabled when the parent and the child are both passengers.

In one embodiment, the linked account system 120 can be further configured to enabled one or more linked account features only when the passenger(s) in the autonomous vehicle 100 includes the child. For instance, when the parent rides in the autonomous vehicle 100 without the child(s), the linked account system 120 may not enable a linked account feature.

Various exemplary linked account features are now described; one of more of the exemplary linked account features can be enabled simultaneously and/or separately. The illustrated linked account features examples can further be enabled at different times throughout the trip of the child passenger and/or the parent passenger. Further, different linked account features may be enabled when the child is the sole passenger and when the parent and the child are taking a trip together.

In an example, the linked account feature may include providing a child passenger additional time to get settled in the autonomous vehicle 100 before the autonomous vehicle 100 begins a trip of the child passenger in the autonomous vehicle 100. For instance, the linked account feature can include providing additional time for a child passenger to get situated in the autonomous vehicle 100 before beginning a trip in the autonomous vehicle 100. The time provided for the child passenger to get situated can be in addition to time provided to a passenger who does not have a parent-child link in their account to get situated in the autonomous vehicle 100. The linked account system 120 can be configured to cause the control system 122 to control at least one of the vehicle propulsion system 108, the braking system 110, or the steering system 112 to cause the autonomous vehicle 100 to remain stationary for a set period of time.

The period of time can be predefined for a child passenger by a parent and/or can be set by a third party that could be universal for a plurality of child passengers. For instance, a period of time can be defined by the parent in an account corresponding to the child passenger prior to requesting a trip for the child passenger in the autonomous vehicle 100. The period of time can depend on a characteristic(s) of the child passenger, a characteristic(s) of the autonomous vehicle 100, and/or a characteristic(s) of the trip. A characteristic of the child passenger can include the age of the child passenger, cognitive ability of the child passenger, and/or the like. A characteristic of the autonomous vehicle 100 can include arrangement of seats within the autonomous vehicle 100. A characteristic of the trip can include a distance of a child passenger from an anticipated pick-up location, a distance from an anticipated drop-off location to a destination of the trip, whether the parent is traveling with the child passenger, and/or the like.

In another example, the linked account feature can include limiting what information is displayed on a user interface device operated by a parent passenger versus one operated by a child passenger. Conventionally, each user interface device in an autonomous vehicle 100 is configured to present a similar interface to for all users (i.e. passengers). The interface can comprise a control interface that presents access to controls of the autonomous vehicle 100. The controls can include starting a trip, ending a trip, locking and/or unlocking doors of the autonomous vehicle 100, requesting support, and/or the like.

The disclosed linked account system 120 can be configured to limit which user interface device presents the control interface and/or to change what is displayed by a user interface device operated by a child passenger. For instance, the linked account feature can include presenting a control interface to a parent passenger and presenting a different interface to a child passenger. In another example, the parent can select what is displayed on a user interface device operated by the child passenger.

Figure 2:
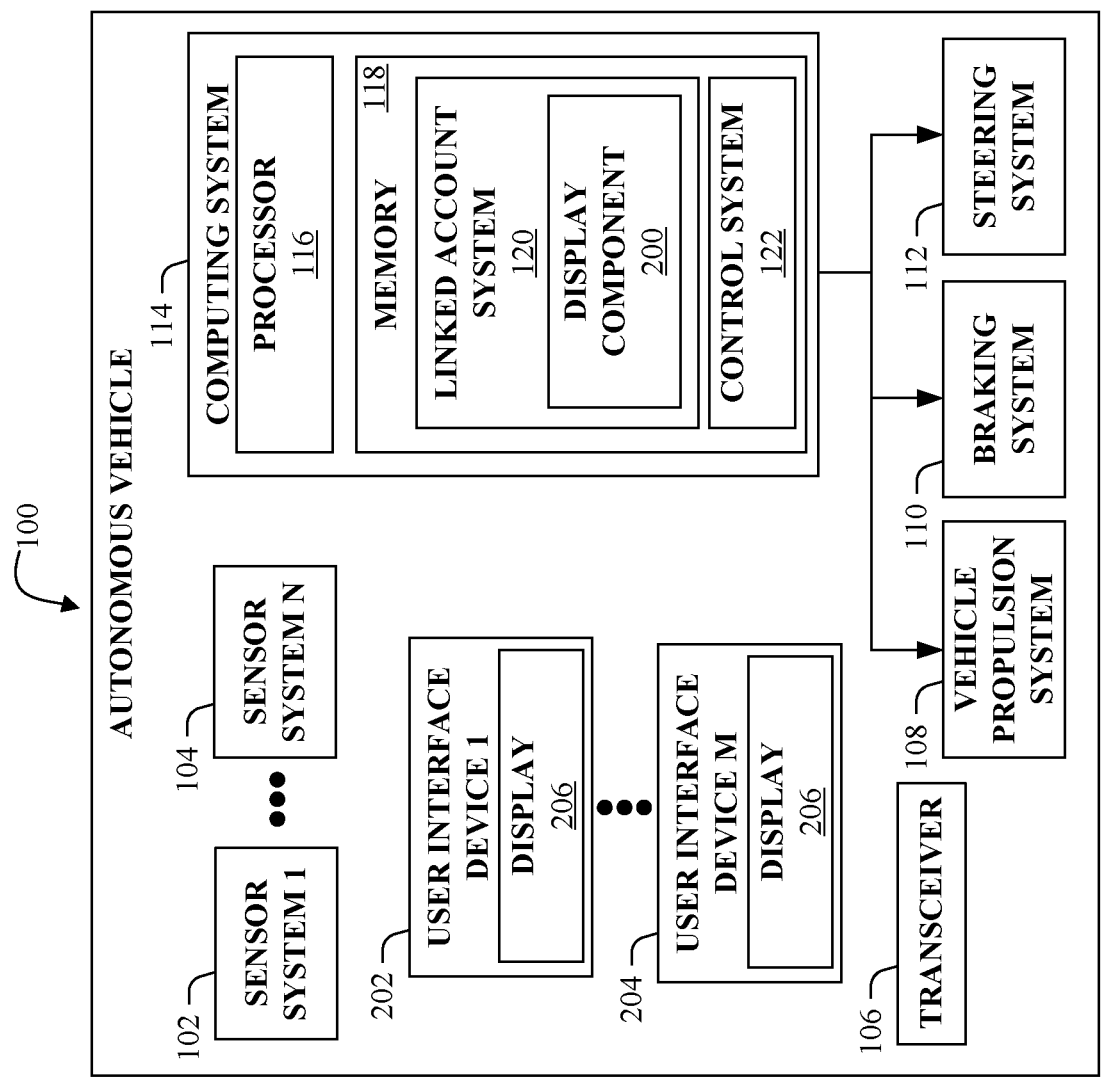
FIG. 2 illustrates another exemplary autonomous vehicle.

As illustrated in FIG. 2, the autonomous vehicle 100 can include a plurality of user interface devices configured for use by a passenger or a plurality of passengers of the autonomous vehicle 100, namely, a user interface device 1 202, . . . , and a user interface device M 204 (collectively referred to herein as user interface devices 202 and 204). The user interface devices 202 and 204 can be arranged about the autonomous vehicle 100 and may be arranged to allow each passenger to interact with a separate user interface device. Each user interface device includes a display 206, whereupon graphical features may be presented. For instance, a graphical user interface (GUI) may be presented as part of the graphical features.

In an illustrative example, the linked account system 120 can include display component 200 configured to require a passenger to enter a code into a user interface device before the user interface device presents the autonomous vehicle 100 controls. The code can comprise any suitable combination for security, such as a four-digit pin or a password. The display component 200 can be further configured to prevent a second (e.g., child) passenger from entering a code into a second user interface device once a parent passenger has entered a code into a user interface device. Thus, by entering the code into a user interface device, a parent passenger can prevent a child passenger from accidentally or intentionally causing a second user interface device to present the control interface. Once the parent passenger enters the code into a user interface device in an autonomous vehicle 100, the display component 200 can additionally be configured to cause the other user interface devices in the autonomous vehicle 100s to present information other than control interface information.

The parent can also cause a user interface device operated by the child passenger to present child-focused content to the child passenger. More specifically, the display component 200 can be further configured to present, via a user interface device, child content designed for a child passenger. The child content can include games, learning modules, and/or children-appropriate videos that a child passenger can watch during a trip of the autonomous vehicle 100. The parent may select in advance what child content is presented to the child passenger or the display component 200 may select what child content is presented based on a characteristic(s) of the child passenger (e.g., age, gender, previous child content, etc.).

In an embodiment, a parent can indicate that a child passenger is riding in a specific seat of the autonomous vehicle 100 during a trip of the autonomous vehicle 100; the display component 200 can then cause a user interface device associated with that specific seat to present the child content. In this embodiment, the parent need not be in the autonomous vehicle 100 and can remotely determine and indicate to the display component 200 what seat the child passenger is riding in.

In another embodiment, a parent passenger in an autonomous vehicle 100 can indicate, via a user interface device operated by the parent passenger, which seat of the autonomous vehicle 100 a child passenger is in and/or which user interface device is operated by a child passenger. In yet another embodiment, the display component 200 can be configured to detect a location of a child passenger within the autonomous vehicle 100 and to cause a user interface device associated with that location to present the child content.

In addition to the control interface, the parent can be provided with child passenger-centric specifications about the autonomous vehicle 100 and/or guide(s) for securing a child passenger in the autonomous vehicle 100. The display component 200 can be configured to cause a user interface device operated by a parent passenger to display child passenger-centric specifications for the autonomous vehicle 100. For instance, the child passenger-centric specifications can include number of seats in the autonomous vehicle 100, available space in the autonomous vehicle 100 to store passenger items (e.g., stroller, child-care bag, etc.), devices for securing a child passenger during a trip of the autonomous vehicle 100 (e.g., seat belts, car seats, etc.), and/or the like.

In another example, the display component 200 can be configured to cause a user interface device operated by a parent passenger to display a guide or guides for securing the child passenger in the autonomous vehicle 100. For example, the guide can include steps for installing and securing a car seat, whether provided with the autonomous vehicle 100 or brought by the parent. The guide can also inform a parent with how to move interior parts of the autonomous vehicle 100, if necessary, to store a stroller or a bag.

In another example, the linked account feature can comprise selectively locking and unlocking doors and/or windows of the autonomous vehicle 100 based on a position of a parent passenger and/or a child passenger. For instance, the autonomous vehicle 100 can be configured to automatically unlock the door associated with a parent passenger and leave the remaining doors locked when the autonomous vehicle 100 reaches a drop-off location. In another example, the autonomous vehicle 100 can require a passenger to enter a specific prompt to unlock one or more of the doors of the autonomous vehicle 100 to prevent a child passenger from accidentally unlocking a door.

Figure 3:
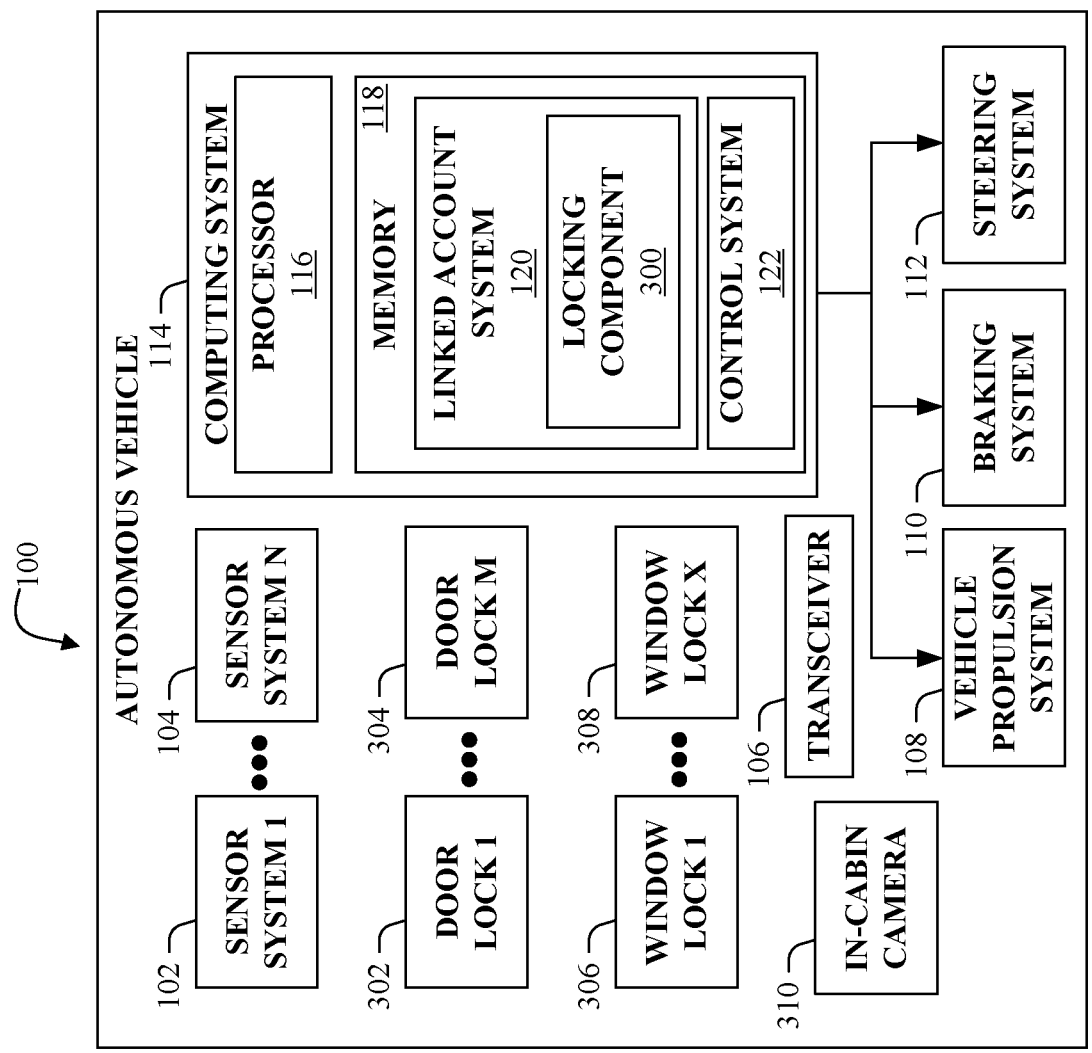
FIG. 3 illustrates a further exemplary autonomous vehicle.

In an embodiment, the autonomous vehicle 100 can include one or more door locks and/or one or more window locks. As illustrated in FIG. 3, the autonomous vehicle 100 can include a door lock 1 302, . . . , and a door lock M 304 (collectively referred to herein as door locks 302 and 304) and a window lock 1 306, . . . , and a window lock X 308 (collectively referred to herein as window locks 306 and 308). The door locks 302 and 304 and the window locks 306 and 308 can each be selectively movable between a locked position and an unlocked position. The linked account system 120 can include a locking component 300 that can be configured to selectively lock and/or unlock parts of the autonomous vehicle 100. More particularly, the locking component 300 can be configured to separately and/or simultaneously lock and/or unlock one or more of the door locks 302 and 304. Similarly, the locking component 300 can be further configured to separately and/or simultaneously lock and/or unlock one or more of the window locks 306 and 308.

In an embodiment, the locking component 300 can be configured to place all the door locks 302 and 304 in the locked position while the autonomous vehicle 100 is traveling between a pick-up location and a drop-off location for a trip of a passenger in the autonomous vehicle 100. The locking component 300 can further be configured to unlock one or more of the door locks 302 and 304 at the pick-up location and/or drop-off location.

In one example, the locking component 300 is configured to only unlock the door lock nearest a location of a parent passenger in the autonomous vehicle 100 at the drop-off location when the parent passenger travels with a child passenger. The location of the parent passenger can be determined by any suitable method. For instance, the location of the parent passenger can be determined by a camera. The autonomous vehicle 100 can further include an in-cabin camera 310 that is configured to monitor an interior of the autonomous vehicle 100. The in-cabin camera 310 can view the entire interior of the autonomous vehicle 100 and/or can focus on a specific passenger of the autonomous vehicle 100. The locking component 300 can receive information generated by the in-cabin camera 310 and unlock one or more of the door locks 302 and 304 based on this information. In another example, the location of the parent passenger can be determined based on which user interface device (FIG. 2) the parent passenger is using.

Subsequent to reaching the drop-off location and unlocking the door lock nearest the parent passenger, the parent passenger can unlock one or more of the other door locks 302 and 304. The parent passenger can unlock another door lock via a manual switch within the autonomous vehicle 100 and/or via a prompt displayed by the user interface device used by the parent passenger. Thus, the locking component 300 can prevent a child passenger from accidentally or intentionally opening a door of the autonomous vehicle 100 without approval from the parent passenger.

The locking component 300 can be further configured to unlock one or more of the door locks 302 and 304 when a passenger (e.g., child passenger, parent passenger) indicates a desire to prematurely end the ride in the autonomous vehicle 100 by interacting with an end ride interface. The end ride interface can include a mechanical button within the autonomous vehicle 100 and/or a widget displayed on a user interface device operated by the passenger. Responsive to a passenger activating the end ride interface, the locking component 300 can unlock one or more of the door locks 302 and 304 once the autonomous vehicle 100 has halted movement.

In an embodiment, the linked account feature comprises presenting a sign informing parties outside the autonomous vehicle 100 that a child passenger is in the autonomous vehicle 100. For instance, the linked account system 120 can active a physical sign in or on the autonomous vehicle 100 with a phrase configured to inform the parties (e.g., "Baby on Board"). The sign can be digital (e.g., light emitting diode (LED)), physical, and/or the like.

Due to the child account 410 being subordinate to the parent account 408 through the parent-child link, the parent can set restrictions on what the child can modify in the child account 410 and/or predefine some parameters in the child account 410 that the child does not have permission to modify. For example, the parent can restrict what destinations the child can set for a trip in the autonomous vehicle 100 and/or the amount of money the child can spend on trips in the autonomous vehicle 100.

The parent can further indicate one or more requirements to be fulfilled by the child passenger and/or the autonomous vehicle 100 before a trip of the child passenger in the autonomous vehicle 100. The requirements can include non-pooled trips in the autonomous vehicle 100 for the child passenger, autonomous vehicle 100 is reasonably free of airborne allergens, the child passenger indicating (e.g. vocally, via a user interface device) they feel secured in the autonomous vehicle after securing a safety device (e.g., seat belt, car seat) before the autonomous vehicle 100 begins the trip, at least one door of the autonomous vehicle 100 is locked before the autonomous vehicle 100 begins the trip, and/or the like.

In the following examples, the linked account feature comprises controlling the autonomous vehicle 100 based on one or more of the parameters defined by the parent and/or restrictions in the child account 410.

For instance, the parent can predefine one or more locations in the child account 410. A predefined location included in the child account 410 can be an address, a name of a place, geographic coordinates, or the like. The predefined location can be defined by the parent in the child account 410 prior to receipt of a request for a trip for the child passenger. Due to the parent-child link making the child account 410 subordinate to the parent account 408, the child may not be able to change the predefined location either accidentally or intentionally.

In another example, the parent can indicate in the child account 410 that a third party is authorized to request a ride for the child. The parent can restrict what location the third party may set as the pickup location. The parent may further specify that a request from the third party for a trip of the child passenger automatically sets a predefined location as the pickup location (e.g., without the request from the third party specifying the pickup location). For instance, the parent can specify in the account of their child that the child is to be picked up at a local Boys and Girls club, for at least one trip in the autonomous vehicle 100. Since the parent may not know exactly when the child will be done at the club, the parent can further indicate that the Boys and Girls club and/or a representative thereof can request a ride for their child from the Boys and Girls club when the child is done at the club. The parent can further indicate what times the third party can request a ride for the child.

In yet another example, the parent can, via the parent-child link, indicate in the child account 410 what funds are available for trips of the child passenger. The child account 410 can include a source of funds (e.g., credit card, debit card, bank account) that can be used to pay for one or more trips in an autonomous vehicle 100. The parent can control the type and/or amount of funds that are available. In one embodiment, the available funds can be used for any type of trip. In another embodiment, the parent can indicate certain types of trips the available funds can be used on.

In a further example, the parent can set certain authorized times in the child account 410 when the child or an authorized third party is permitted to request a trip in an autonomous vehicle 100.

Figure 4:
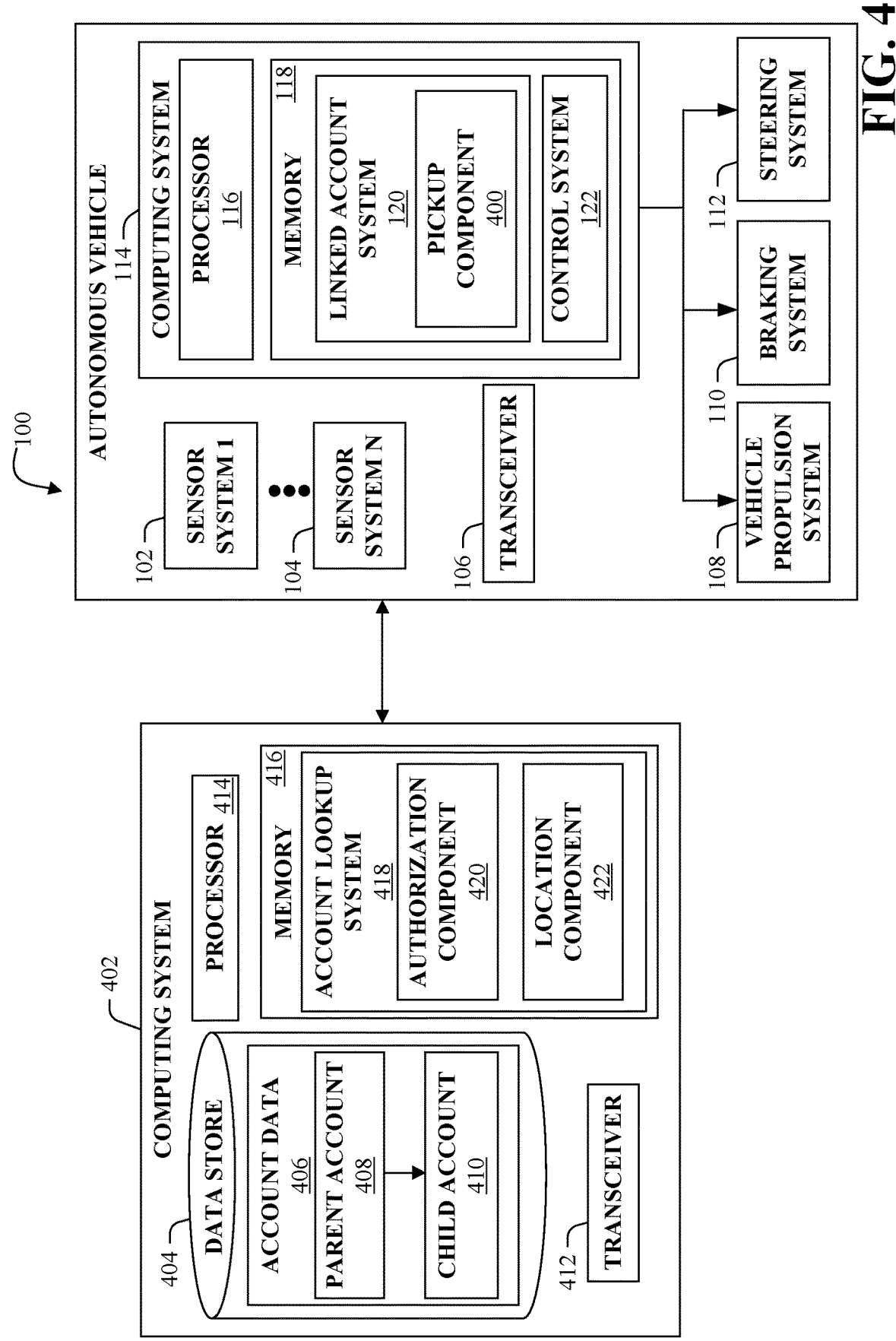
FIG. 4 illustrates an exemplary autonomous vehicle in communication with a computing system.
Figure 5:
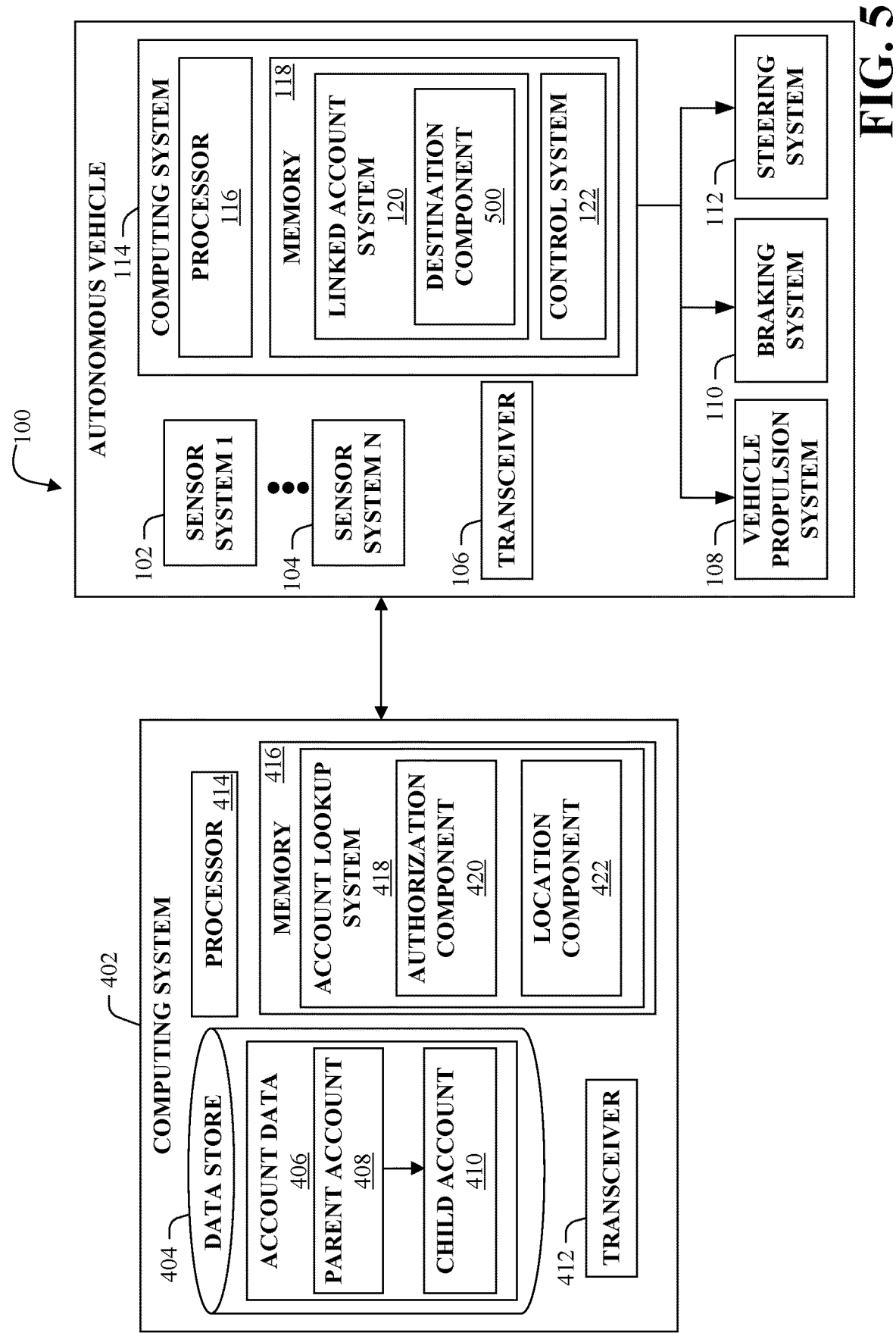
FIG. 5 illustrates another exemplary autonomous vehicle in communication with a computing system.

Turning now to FIGS. 4 and 5, in an embodiment, the autonomous vehicle 100 can be in communication with a computing system 402 via the transceiver 106 in the autonomous vehicle 100. The computing system 402 can similarly include a transceiver 412. The transceiver 412 is configured to transmit data from the computing system 402 and/or receive data at the computing. Thus, the computing system 402 can be in communication with the autonomous vehicle 100 and vice versa.

The computing system 402 further includes a data store 404 which may include account data 406. The account data 406 may include one or more accounts each associated with identification information of different users. For instance, a first account can be associated with a first user while a second account can be associated with a second user. As illustrated in FIG. 4, two or more of the accounts can have a parent-child link therebetween. The account data 406 can include a plurality of different linked accounts.

The computing system 402 yet further includes a processor 414 and memory 416 that includes computer-executable instructions that are executed by the processor 414. In an example, the processor 414 can be or include a graphics processing unit (GPU), a plurality of GPUs, a central processing unit (CPU), a plurality of CPUs, an application-specific integrated circuit (ASIC), a microcontroller, or the like.

The memory 416 includes an account lookup system 418 configured to receive a request for a trip of a passenger in an autonomous vehicle 100. The request can include identification information associated with the passenger. The account lookup system 418 can determine whether an account associated with the identification information of the passenger includes a parent-child link. Responsive to detecting a parent-child link, the account lookup system 418 can further be configured to determine whether the child passenger is authorized to take the trip in the autonomous vehicle 100.

The account lookup system 418 can include an authorization component 420 and/or a location component 422. The authorization component 420 can be configured to determine whether a request for a trip of the child in an autonomous vehicle 100 is authorized based on the parameters and/or restrictions in the child account 410 that are defined by the parent prior to receipt of the request. For instance, the authorization component 420 can determine whether the party is authorized to make the request and/or whether sufficient funds are available for the trip. In an illustrative example, the authorization component 420 can be configured to compare the party requesting the trip with approved parties, such as the parent, the child, and/or a third party (e.g., Boys and Girls Club) authorized by the parent prior to receipt of the request. In another illustrative example, the authorization component 420 can be configured to calculate a cost of the trip and to determine whether the child account 410 includes sufficient funds for the trip. In a yet further illustrative example, the authorization component 420 can be configured to determine whether the child is requesting a trip during an authorized time. Where the request is made outside of an authorized time period, the authorization component 420 can cause a display to inform the child that the request cannot be completed.

The location component 422 can be configured to determine whether the child account 410 includes a predefined location that is defined by the parent via the parent-child link. Responsive to detecting a predefined location, the location component 422 can be further configured to transmit the predefined location to the autonomous vehicle 100. The location component 422 can perform the determination responsive to receiving an indication from the authorization component 420 that the request is authorized or may be performed independently.

Turning to FIG. 4, the linked account feature can comprise setting a predefined location in the child account 410 as a pickup location for a trip of the child in the autonomous vehicle 100. Conventionally, a request for a ride of a passenger in an autonomous vehicle 100 will include an indication of a pick-up location where the passenger can enter the autonomous vehicle 100. In contrast, responsive to receiving an indication of a parent-child link and one or more predefined locations from the location component 422, the disclosed linked account system 120 will automatically set a predefined location in the child account 410 as the pickup location. The linked account system 120 can include a pickup component 400 configured to receive an indication of the one or more predefined locations from the location component 422 and to set a predefined location as a pickup location for a trip of the child passenger in the autonomous vehicle 100.

The linked account feature can comprise setting a predefined location in the child account 410 as a destination for a trip of the child in the autonomous vehicle 100. Conventionally, a request for a ride of a passenger in an autonomous vehicle 100 will include an indication of a destination. In contrast, responsive to receiving an indication of a parent-child link and one or more predefined locations from the location component 422, the disclosed linked account system 120 can automatically set a predefined location in the child account 410 as the destination for the child passenger (e.g., without the request for the ride specifying the destination). The parent can indicate a plurality of predefined locations in their child's account. Each of the plurality of predefined locations can be associated with one or more time periods, such as 2 p.m. Eastern Standard Time (EST) to 3 p.m. EST, Monday and Tuesday 1 p.m. EST to 4 p.m. EST, and/or Wednesday, Jan. 9, 2019. The time period can indicate a time during which the linked account system 120 should set the predefined location as the destination for the trip of the child passenger.

As illustrated in FIG. 5, the linked account system 120 can include a destination component 500. In an embodiment, the destination component 500 can receive from the location component 422 an indication of one or more predefined locations in the child account 410. The destination component 500 can then select one of the predefined locations to be set as a destination for the trip of the child passenger in the autonomous vehicle 100. The destination component 500 can be configured to select the predefined location based on an anticipated time the child passenger would reach the predefined location. In another embodiment, the destination component 500 can be configured to limit the destination(s) a child passenger can select when requesting a ride. More specifically, when the child passenger requests a trip in the autonomous vehicle 100, the destination component 500 can present to the child passenger one or more of the predefined locations in the child account 410. The child passenger can then select one of the predefined locations to set as the destination for the trip. Thus, a parent can limit what destination a child passenger can select when they request a trip in the autonomous vehicle 100s.

Figure 6:
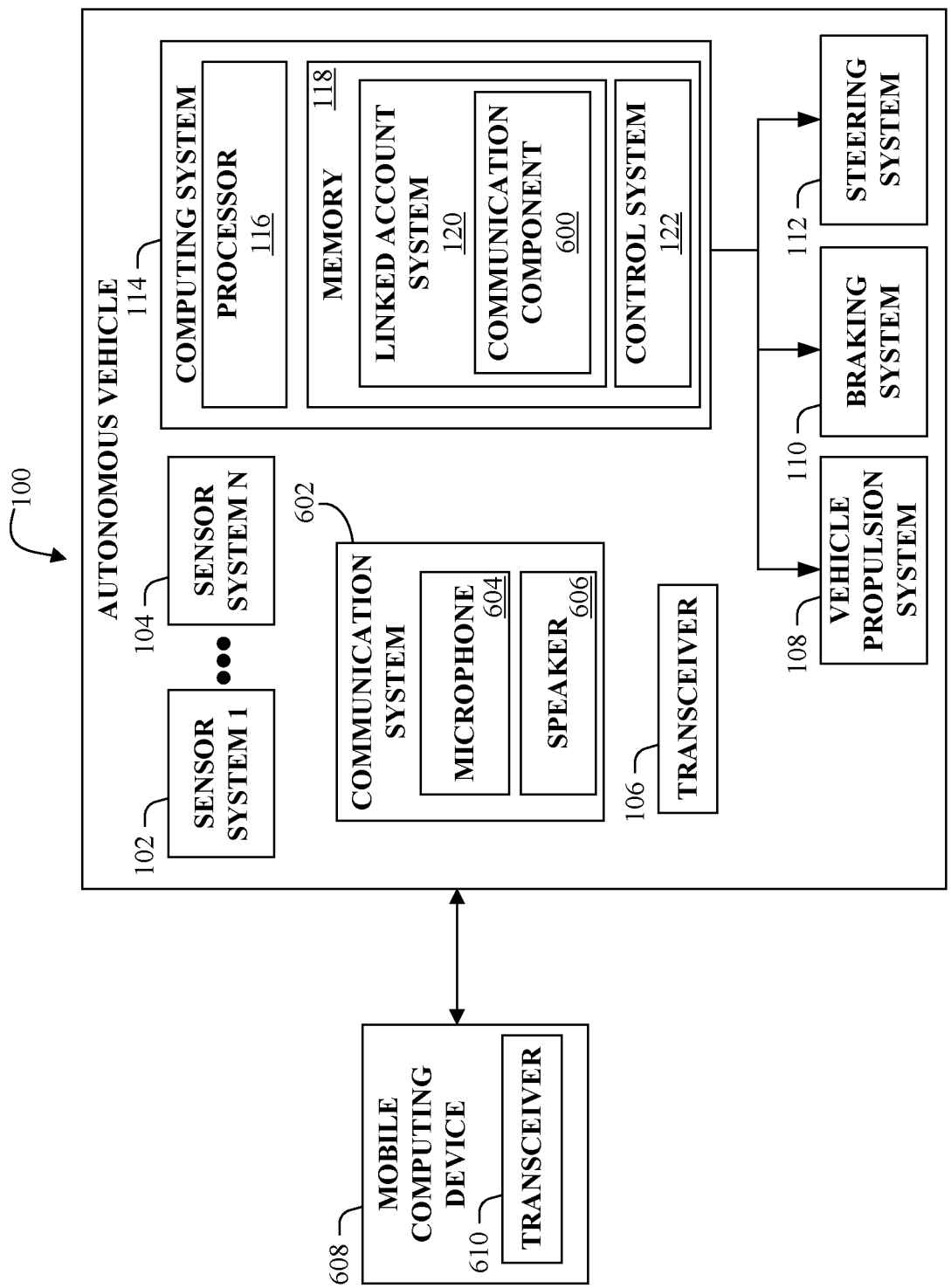
FIG. 6 illustrates an exemplary autonomous vehicle in communication with a mobile computing device.

Turning now to FIG. 6, the parent-child link can further indicate a contact party in case of a support situation while the child passenger is riding in the autonomous vehicle 100. The linked account feature can comprise placing the child passenger in communication with their parent when a support situation occurs. For instance, the autonomous vehicle 100 can automatically place the child in contact with their parent in an emergency. In another embodiment, the autonomous vehicle 100 can place the child passenger in contact with a support agent (e.g., a person who provides support to the passenger) who would then use information indicated by the parent-child link to put the child in contact with their parent. In one embodiment the child passenger can be placed in contact with a support agent. In another embodiment, the child passenger can be placed in contact with a digital assistant (in addition to or instead of the support agent). The child can then communicate with their parent or the support agent vocally, textually, and/or the like. The support situation can comprise the sensor system in the autonomous vehicle 100 detecting a predefined support event, the child passenger indicating a request for support, and/or any suitable system for detecting a passenger's need for support.

As illustrated in FIG. 6, the linked account system 120 can include a communication component 600 configured to establish a communication channel between the child passenger and a mobile computing device 608 operated by the parent and/or a support agent to exchange communication data. The mobile computing device 608 has an application installed on it that allows for the application and the communication component 600 to establish the communication channel. The communication component 600 may be further configured to receive messages transmitted from the mobile computing device 608 via the communication channel. The communication channel can be vocal, textual, and/or the like.

For instance, as illustrated in FIG. 6, the autonomous vehicle 100 can include a vocal communication system 602 that may be configured for use by a passenger of the autonomous vehicle 100. The communication system 602 includes a microphone 604 configured to receive audio data, including speech input from the passenger. The speech input from the passenger can include any vocal sound made by the passenger, such as words, phrases, a groan, etc. The communication system 602 further includes a speaker 606 configured to emit sound. The speaker 606 can be located in any position in the autonomous vehicle 100 suitable for the sound reaching the passenger. For example, the communication system 602 can comprise a network of speaker 606s located around an interior of the autonomous vehicle 100. Responsive to detection of a support situation, the communication component 600 can establish a vocal communication channel with a parent of the child indicated by the parent-child link. In an embodiment, the vocal communication channel can be established between the autonomous vehicle 100 and the parent indicated by the parent-child link automatically responsive to detecting a support situation. In another embodiment, the vocal communication channel is established between the autonomous vehicle 100 and support personnel. The support personnel can then establish a vocal communication channel between the autonomous vehicle 100 and the parent indicated by the parent-child link.

In another example, a textual communication channel is established between the autonomous vehicle 100 and the parent indicated by the parent-child link. The child passenger may use a user interface device (FIG. 2) in the autonomous vehicle 100 to communicate with the parent textually.

The support personnel can additionally place the parent in contact with the child passenger via one or more of the communication devices described above after verifying the existence of a parent-child link. For instance, a parent can contact support personnel and request to be placed in contact with a child passenger of an autonomous vehicle 100. The support personnel can then verify a parent-child link in accounts corresponding to the parent and the child passenger. Responsive to the verification, the support personnel can cause the communication component 600 to establish a communication channel between the autonomous vehicle 100 and the parent.

Figure 7:
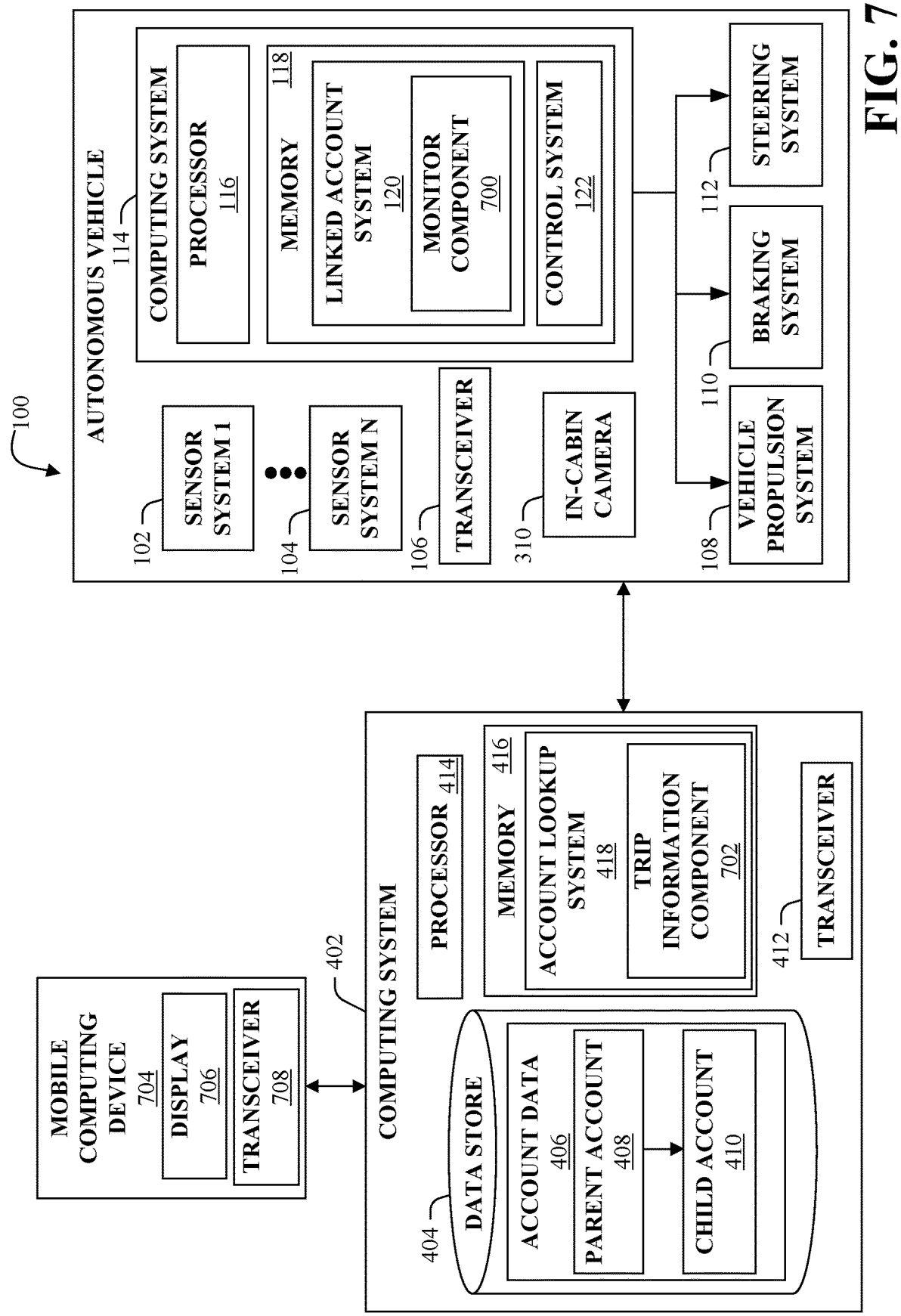
FIG. 7 illustrates an exemplary computing system in communication with an autonomous vehicle and a mobile computing device.

Turning now to FIG. 7, the parent-child link can further cause certain autonomous vehicle information to be presented to the parent by way of a display 706 on the parent's mobile computing device 704 before, during, and/or after a trip in the autonomous vehicle 100 when the child is a passenger during the trip. The same information can be presented to the parent when the parent is an additional passenger during the trip or a second set of autonomous vehicle information can be presented to the parent. By comparison, when the parent is a passenger in the autonomous vehicle 100 without the child, a third set, if any, of autonomous vehicle information can be presented to the parent.

The autonomous vehicle information can include autonomous vehicle 100 specifications, geolocation of the autonomous vehicle 100, a view of the interior cabin of the autonomous vehicle 100, a view of the exterior of the autonomous vehicle 100, and/or the like. In an embodiment, the parent can indicate, via the parent-child link, a preference for certain autonomous vehicle information. In another embodiment, default autonomous vehicle information can be presented to the parent.

In an embodiment illustrated in FIG. 7, the computing system 402 can be in communication with both a mobile computing device 704 and the autonomous vehicle 100. More specifically, the transceiver 412 of the computing system 402 can send data to and/or receive data from both the autonomous vehicle 100 and the mobile computing. The mobile computing device 704 can similarly include a transceiver 708 configured to transmit data from the mobile computing device 704 and/or receive data at the mobile computing device 704. Thus, the mobile computing device 704 can be in communication with the computing system 402. The mobile computing can further include a display, whereupon graphical features may be presented. For instance, a graphical user interface (GUI) may be presented as part of the graphical features.

The account lookup system 418 of the computing device can further include a trip information component 702 configured to cause the display of the mobile computing device 704 to present the autonomous vehicle information. The trip information component 702 can be further configured to select which mobile computing device 704 will display the autonomous vehicle information. In an embodiment, the trip information component 702 can select a mobile computing device 704 associated with an account of the parent to display the autonomous vehicle information. In another embodiment, the trip information component 702 can select both the mobile computing device 704 associated with the account of the parent and a mobile computing device 704 associated with an account of an authorized third party (described above) to display some or all the trip information. For instance, the parent can indicate that the mobile computing device 704 of the authorized third party can display a current location of the autonomous vehicle 100 during the trip of the child passenger.

The linked account system 120 of the autonomous vehicle 100 can further include a monitor component 700. Responsive to receiving an indication of the parent-child link, the monitor component 700 can transmit data to the computing system 402 which can then be formulated for display by the mobile computing device 704. For instance, the data can include a current geolocation of the autonomous vehicle 100, anticipated time of arrival at the pickup location and/or drop-off location, license plate of the autonomous vehicle 100, make and/or model of the autonomous vehicle 100, and/or the like. The data can also indicate cleaning procedures used for airborne allergens and/or presence of detectable airborne allergens within a cabin of the autonomous vehicle 100. The data can yet further include pictorial and/or video data from the in-cabin camera 310 regarding the interior cabin of the autonomous vehicle 100. The data can even further include pictorial and/or video data from the sensor systems 102 and 104 regarding an exterior of the autonomous vehicle 100 before, during, and/or after the trip of the child passenger.

The trip information component 702 can then synthesize this data and cause the display of the mobile computing device 704 to display autonomous vehicle information. The trip information component 702 can be further configured to cause the display of the mobile computing device 704 to present one or more alerts before, during, and/or after the trip of the child passenger. The alerts can be configured to inform the parent of potentially noteworthy events. For instance, the parent can receive an alert when the autonomous vehicle 100 is near the pickup location and/or drop-off location, when the child passenger enters and/or exits the autonomous vehicle 100, when the autonomous vehicle 100 experiences a traffic delay during the trip, and/or the like.

Figure 8:
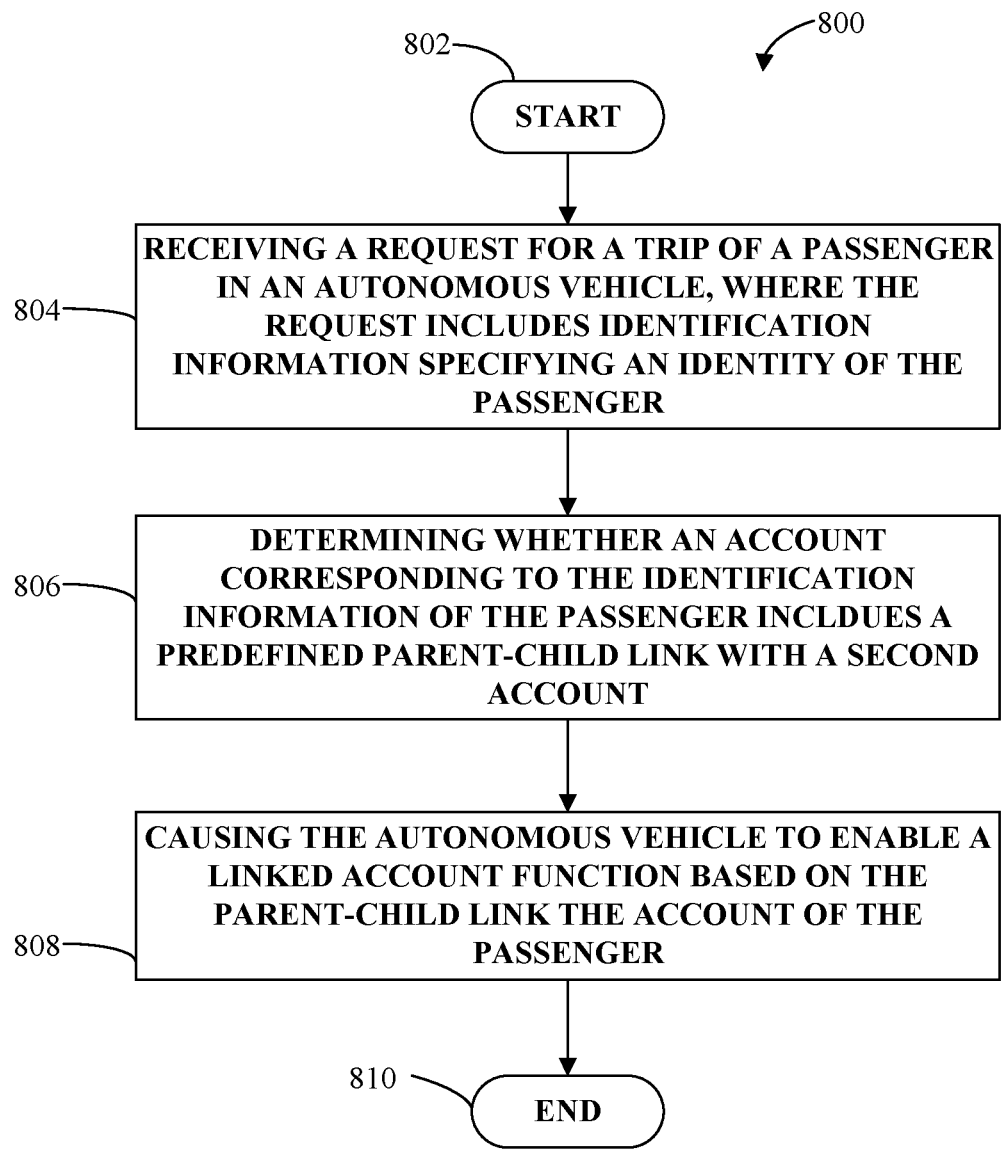
FIG. 8 is a flow diagram that illustrates an exemplary methodology executed by an autonomous vehicle for controlling operation of the autonomous vehicle based on a parent-child link.

FIG. 8 illustrates an exemplary methodology relating to controlling an autonomous vehicle based on a parent-child link for a child. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 8 an exemplary methodology 800 is illustrated. The methodology 800 starts at 802, and at 804, a processor receives a request for a trip of a passenger in an autonomous vehicle. The request can include identification information specifying an identity of the passenger. At 806, the processor determines whether an account corresponding to the identification information of the passenger includes a predefined parent-child link with a second account. The predefined parent-child link can indicate a parent-child relationship between the passenger and a party associated with the second account. The parent-child link is defined in the account corresponding to the passenger maintained by a computing system prior to receipt of the request for the trip of the passenger in the autonomous vehicle. At 808, responsive to detecting the parent-child link and the passenger comprising the child in the parent-child relationship the processor causes the autonomous vehicle to enable a linked account feature based on the parent-child link in the account of the passenger. The linked account feature is disabled in the absence of the parent-child link. The methodology 800 concludes at 810.

In an embodiment of the methodology 800, responsive to detecting the parent-child link and the passenger comprising the child in the parent-child relationship, the processor further causes a display of mobile computing device operated by the parent in the parent-child relationship to display safety information regarding the child passenger riding in the autonomous vehicle. The safety information can include a guide for securing the child passenger in the autonomous vehicle.

In another embodiment of the methodology 800, responsive to detecting the predefined parent-child link, the passenger comprising the child in the parent-child relationship, and the parent in the parent-child relationship being a second passenger for the trip of the autonomous vehicle, causing the autonomous vehicle to enable a second linked account feature, wherein the second linked account feature is different from the linked account feature. The second linked account feature is disabled in the absence of the parent-child link and the parent and the child riding together.

Figure 9:
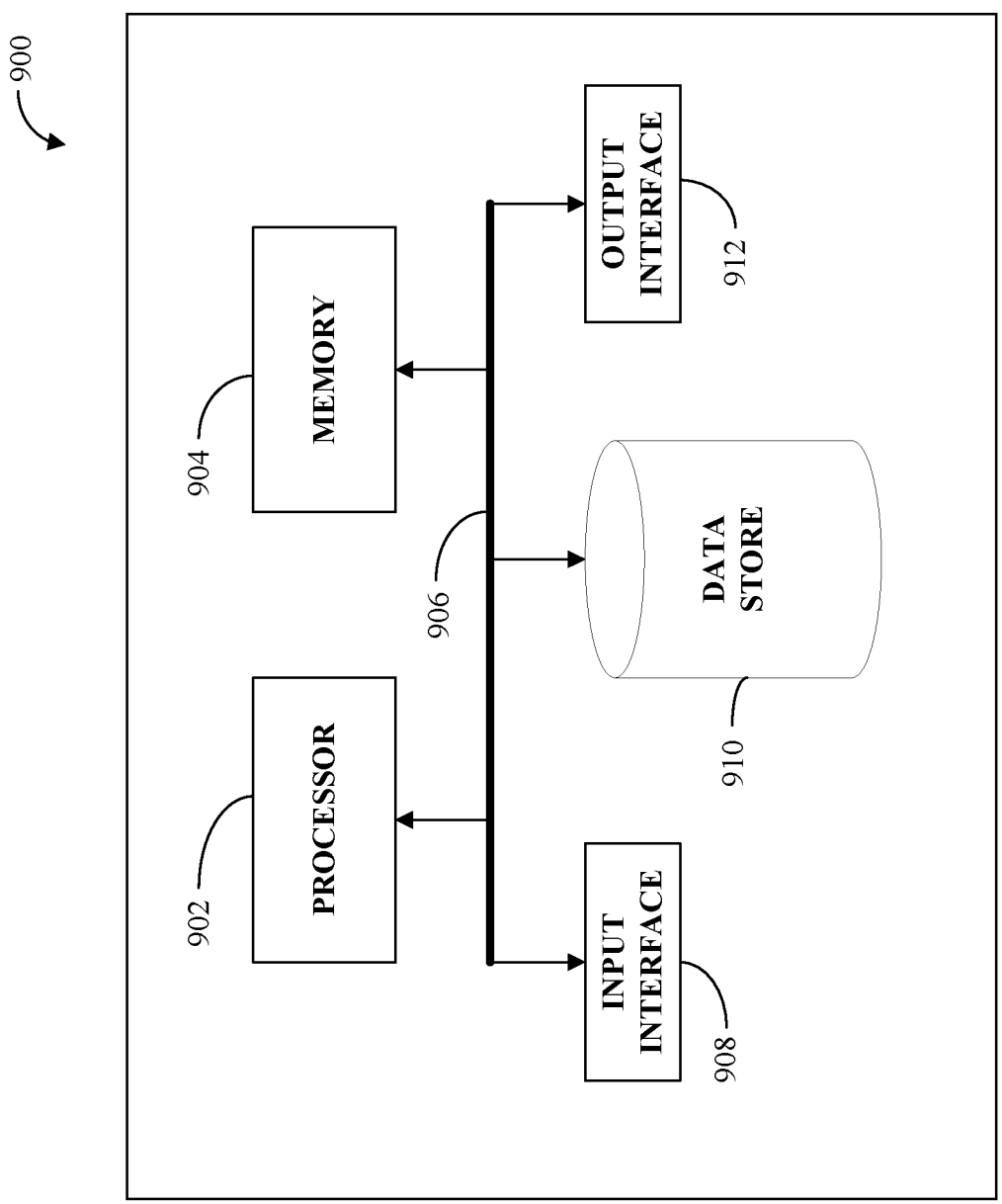
FIG. 9 illustrates an exemplary computing system.

Referring now to FIG. 9, a high-level illustration of an exemplary computing device that can be used in accordance with the systems and methodologies disclosed herein is illustrated. For instance, the computing device 900 may be or include the mobile computing device or the computing system. The computing device 900 includes at least one processor 902 that executes instructions that are stored in a memory 904. The instructions may be, for instance, instructions for implementing functionality described as being carried out by one or more components discussed above or instructions for implementing one or more methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store geolocation coordinates of suggested locations or landmarks, roadways, user identification, user preferences, etc.

The computing device 900 additionally includes a data store 910 that is accessible by the processor 902 by way of the system bus 906. The data store 910 may include executable instructions, geolocation coordinates of suggested locations or landmarks, roadways, user identification, user preferences, etc. The computing device 900 also includes an input interface 908 that allows external devices to communicate with the computing device 900. For instance, the input interface 908 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
    at least a first door and a second door; and
    a computing system, comprising:
        a processor; and
        memory that stores computer-executable instructions that, when executed by the processor, cause the processor to perform acts comprising:
            identifying that a first passenger of the autonomous vehicle during a trip in the autonomous vehicle is a child;
            identifying that a second passenger of the autonomous vehicle during the trip in the autonomous vehicle is a parent of the child, wherein a predefined parent-child link exists between an account of the parent and an account of the child;
            detecting locations of the parent and the child within the autonomous vehicle during the trip in the autonomous vehicle, wherein the child is detected as being adjacent to the first door within the autonomous vehicle during the trip in the autonomous vehicle and the parent is detected as being adjacent to the second door within the autonomous vehicle during the trip in the autonomous vehicle; and responsive to the autonomous vehicle reaching a drop-off location, unlocking the second door of the autonomous vehicle adjacent to the parent, wherein the first door of the autonomous vehicle adjacent to the child remains locked responsive to the autonomous vehicle reaching the drop-off location.

2. The autonomous vehicle of claim 1, further comprising:
an in-cabin camera, wherein the in-cabin camera is configured to detect the locations of the parent and the child within the autonomous vehicle during the trip in the autonomous vehicle.

3. The autonomous vehicle of claim 1, further comprising:
a user interface device, wherein the user interface device is configured to detect that the parent is using the user interface device, and wherein a position of the user interface device within the autonomous vehicle signifies that the parent is adjacent to the second door within the autonomous vehicle.

4. The autonomous vehicle of claim 3, the acts further comprising:
responsive to receiving input from the parent via the user interface device and subsequent to the second door of the autonomous vehicle being unlocked, unlocking the first door of the autonomous vehicle adjacent to the child.

5. The autonomous vehicle of claim 1, the acts further comprising:
receiving a request for the trip in the autonomous vehicle for the first passenger and the second passenger, wherein the request includes an indication of the predefined parent-child link.

6. The autonomous vehicle of claim 1, the acts further comprising:
receiving a request for the trip in the autonomous vehicle for the first passenger and the second passenger; and
responsive to receiving the request, identifying that the predefined parent-child link exists between the account of the parent and the account of the child.

7. The autonomous vehicle of claim 1, further comprising:
at least a first user interface device and a second user interface device, wherein the first user interface device is nearby the first door and the second user interface device is nearby the second door within the autonomous vehicle.

8. The autonomous vehicle of claim 7, the acts further comprising:
responsive to detecting that the child is nearby the first user interface device within the autonomous vehicle during the trip in the autonomous vehicle, presenting child content on the first user interface device.

9. The autonomous vehicle of claim 7, the acts further comprising:
responsive to detecting that the parent is nearby the second user interface device within the autonomous vehicle during the trip in the autonomous vehicle, displaying information pertaining to securing children in the autonomous vehicle on the second user interface device.

10. The autonomous vehicle of claim 1, wherein the predefined parent-child link sets permissions concerning parameters in the account of the child that are modifiable by the child.

11. The autonomous vehicle of claim 1, further comprising:
at least a first window and a second window;
wherein the acts further comprise:
responsive to detecting that the child is adjacent to the first window within the autonomous vehicle and the parent is adjacent to the second window during the trip in the autonomous vehicle, unlocking the second window to enable the second window to open and close, wherein the first window remains locked.

12. A method performed by a computing system, comprising:
receiving a request for a trip of a passenger in an autonomous vehicle, wherein the request includes identification information specifying an identity of the passenger;
responsive to receiving the request, determining whether a predefined parent-child link exists between an account corresponding to the identification information of the passenger and a second account associated with a second person, wherein the predefined parent-child link results in the account associated with the passenger being subordinate to the second account, wherein the predefined parent-child link indicates a parent-child relationship between the passenger and the second person, wherein the predefined parent-child link is defined between the account corresponding to the passenger maintained by the computing system and the second account prior to receipt of the request for the trip of the passenger in the autonomous vehicle, wherein the account corresponding to the identification information of the passenger includes a predefined location defined in the account maintained by the computing system prior to receipt of the request;
receiving an indication a parent of the parent-child relationship is a second passenger for the trip of the autonomous vehicle; and
responsive to receiving the indication of the predefined parent-child link and receiving the indication of presence of the parent passenger, unlocking a door from the plurality of doors nearest the parent passenger when the autonomous vehicle reaches a drop-off location, wherein other doors in the plurality of doors are in a locked position preventing the other doors from being opened.

13. The method of claim 12, further comprising:
responsive to detecting the predefined parent-child link and the passenger comprising the child in the parent-child relationship, causing a display of a mobile computing device operated by the second passenger to present a message indicative of safety information regarding securing the child passenger in the autonomous vehicle.

14. The method of claim 12, further comprising:
detecting locations of the parent and the child within the autonomous vehicle during the trip in the autonomous vehicle utilizing an in-cabin camera of the autonomous vehicle.

15. A computing device, comprising:
a computing system, comprising:
a processor; and
memory that stores computer-executable instructions that, when executed by the processor, cause the processor to perform acts comprising:
identifying that a first passenger of an autonomous vehicle during a trip in the autonomous vehicle is a child;

identifying that a second passenger of the autonomous vehicle during the trip in the autonomous vehicle is a parent of the child, wherein a predefined parent-child link exists between an account of the parent and an account of the child;

detecting locations of the parent and the child within the autonomous vehicle during the trip in the autonomous vehicle, wherein the child is detected as being adjacent to a first door within the autonomous vehicle during the trip in the autonomous vehicle and the parent is detected as being adjacent to a second door within the autonomous vehicle during the trip in the autonomous vehicle; and responsive to the autonomous vehicle reaching a drop-off location, unlocking the second door of the autonomous vehicle adjacent to the parent, wherein the first door of the autonomous vehicle adjacent to the child remains locked responsive to the autonomous vehicle reaching the drop-off location.

16. The computing system of claim 15, the acts further comprising:

detecting the locations of the parent and the child within the autonomous vehicle during the trip in the autonomous vehicle utilizing an in-cabin camera of the autonomous vehicle.

17. The computing system of claim 15, the acts further comprising:

responsive to receiving input from the parent via a user interface device and subsequent to the second door of the autonomous vehicle being unlocked, unlocking the first door of the autonomous vehicle adjacent to the child.

18. The computing system of claim 15, the acts further comprising:

responsive to detecting that the child is nearby a particular user interface device within the autonomous vehicle during the trip in the autonomous vehicle, presenting child content on the particular user interface device.

19. The computing system of claim 15, the acts further comprising:

responsive to detecting that the parent is nearby a particular user interface device within the autonomous vehicle during the trip in the autonomous vehicle, displaying information pertaining to securing children in the autonomous vehicle on the particular user interface device.

20. The computing system of claim 15, the acts further comprising:

responsive to detecting that the child is adjacent to a first window within the autonomous vehicle and the parent is adjacent to a second window within the autonomous vehicle during the trip in the autonomous vehicle, unlocking the second window to enable the second window to open and close, wherein the first window remains locked.

* * * * *